United States Patent [19]

Klop et al.

[11] 4,309,201
[45] Jan. 5, 1982

[54] METHOD OF AND APPARATUS FOR MANUFACTURING OPTICAL FIBRES

[75] Inventors: Marius A. F. Klop; Wilhelmus C. P. M. Meerman; Jan G. J. Peelen; Hermanus N. Tuin, all of Eindhoven, Netherlands

[73] Assignee: U.S. Philips Corporation, New York, N.Y.

[21] Appl. No.: 132,470

[22] Filed: Mar. 19, 1980

[30] Foreign Application Priority Data

Mar. 21, 1979 [NL] Netherlands ............... 7902201

[51] Int. Cl.³ ............................................. C03B 37/00
[52] U.S. Cl. ................................................. 65/2; 65/12; 65/13; 65/32
[58] Field of Search .......... 65/1, 2, 3.11, 3.12, 65/12, 3.2, 13, 11 W, 32

[56] References Cited

U.S. PATENT DOCUMENTS 4,030,901  6/1977  Kaiser .................................. 65/2
4,101,300  7/1978  Imoto .................................. 65/12 X
4,123,242  10/1978 Imoto .................................. 65/11 W

FOREIGN PATENT DOCUMENTS 560841  6/1977  U.S.S.R. .

OTHER PUBLICATIONS

Resistance Heated ... Optical Communications, Payne et al., Ceramic Bulletin, vol. 55, #2, (1976), pp. 195-197.
Alanta Fiber System Experiment, Myers et al., Bell System Technical Journal, vol. 57, #6, Jul.-Aug. 1978, pp. 1735-1744.

Primary Examiner—Robert L. Lindsay, Jr.
Attorney, Agent, or Firm—Marc D. Schechter

[57] ABSTRACT

Method of and apparatus for manufacturing optical fibers in which a preform is heated in a furnace which is provided with a graphite heating element and a fiber is drawn from the heated preform. The fiber is subsequently cooled, provided with a coating, and, after drying of the coating, the fiber is wound onto a reel.

During drawing of the fiber, the preform and fiber are flushed with a gas. According to the invention the gas with which the fiber is flushed is passed along a condensation element.

7 Claims, 3 Drawing Figures

METHOD OF AND APPARATUS FOR MANUFACTURING OPTICAL FIBRES

BACKGROUND OF THE INVENTION

The invention relates to a method of manufacturing optical fibers wherein a preform is heated in a furnace, one end of the preform is melted, a fiber is being drawn from the melting end of the preform, and the fiber is withdrawn from the furnace. In this method, the portions of the preform and of the fiber located in the furnace are flushed with a gas, after which the drawn fiber is cooled and provided with a coating which is subsequently dried. Finally, the fiber obtained is wound onto a reel.

Such a method is known from the article "Preform Fabrication and Fiber Drawing by Western Electric Product Engineering Control Center", published in The Bell System Technical Journal, Vol. 57, No. 6, July-August 1978, pages 1735 to 1744.

For heating the preform this known method employs a graphite resistance element. Owing to its thermal and mechanical properties, i.e. a high thermal shock resistance and a suitable strength at high temperatures, graphite is extremely suitable for this purpose. Moreover, graphite is comparatively cheap, available in pure form and easy to work. However, graphite has the drawback that at the operating temperatures of approximately 2000° C. it is subject to substantial oxidation.

It is known that the drawing conditions may adversely affect the strength of the fiber drawn. Contamination of the fiber by dust particles, owing to the deposition of reaction products from the furnace, such as for example silicon carbide, silica particles etc. will result in damaging and deterioration of the fiber. Contamination of the fiber by dust particles can be avoided by a dust-free environment. The formation of reaction products can be limited by maintaining an inert-gas atmosphere at overpressure in the furnace, so that the admission of air is prevented. Settlement of reaction products on the fiber can be minimized by flushing the fiber with an inert gas stream.

SUMMARY OF THE INVENTION

It is an object of the invention to provide a method of manufacturing optical fibers which results in a quality improvement and an increased tensile strength of the fibers which are manufactured.

According to the invention this object is achieved mainly in that the gas flushed around the fiber is passed from the interior of the furnace to the exterior of the furnace along a condensation element which surrounds the fiber.

The condensation element functions as a cold spot, so that gaseous reaction products settle on the condensation element, and the fiber itself is kept clean.

Comparative measurements have revealed that fibers manufactured by the method in accordance with the invention have a greater tensile strength than fibers manufactured with prior art methods.

The invention also relates to apparatus for carrying out the method. This apparatus comprises a holder for a preform, a furnace, a coating device, a drying device, a drawing device and a winding device. The furnace is provided with a graphite resistance element having a central heating chamber, with an entrance opening with a seal, with an exit opening, and with a supply duct for the supply of a gas. According to the invention the furnace is provided with a tubular condensation element which is arranged in the exit opening. The center lines of the condensation element and of the heating chamber concide, and one end of the condensation element extends into the heating chamber and the other end projects from the furnace. The tubular element has a heated end and a relatively cool end with a substantial temperature drop in the axial direction. Owing to the coaxial arrangement of the condensation element relative to the heating chamber and owing to its comparatively great length, the fiber drawn from the preform is surrounded and protected by the condensation element over practically the entire cooling path. The condensation element guides the gas stream which is flushed around the fiber being drawn.

In a preferred embodiment of the apparatus according to the invention, the condensation element is secured in a central bore of a disc-shaped support, which is formed with a plurality of outlet ducts and which is arranged in the exit opening of the furnace. The support serves for the correct positioning of the condensation element and for the partial closure of the exit opening. The inert gas fed through the supply duct partly flows along the seal into the supply duct and along the preform, partly via the condensation element along the fiber being drawn and partly via the outlet ducts to the exterior. The condensation element, the seal in the supply duct and the outlet ducts have been proportioned so that an overpressure is sustained in the furnace.

In another preferred embodiment of the apparatus according to the invention, the condensation element is made of quartz glass. The color of the free end portion of the optically conductive quartz glass element, which portion projects from the furnace, is an indication of the temperature as well as of the correct location of the hot end in the heating chamber. Furthermore, it appears that with a condensation element of quartz glass a satisfactory condensation of the reaction products can be obtained.

In a further preferred embodiment of the apparatus according to the invention the condensation element is made of platinum. Platinum can withstand higher temperatures than quartz glass and it has a much higher coefficient of thermal conductivity than quartz glass. As a result, a condensation element made of platinum may be arranged near the melting zone with one end extending into the heating chamber, so that a better protection of the fiber is obtained.

BRIEF DESCRIPTION OF THE DRAWINGS

The invention will be described in more detail with reference to the drawing.

DESCRIPTION OF THE PREFERRED EMBODIMENTS

Figure 1:
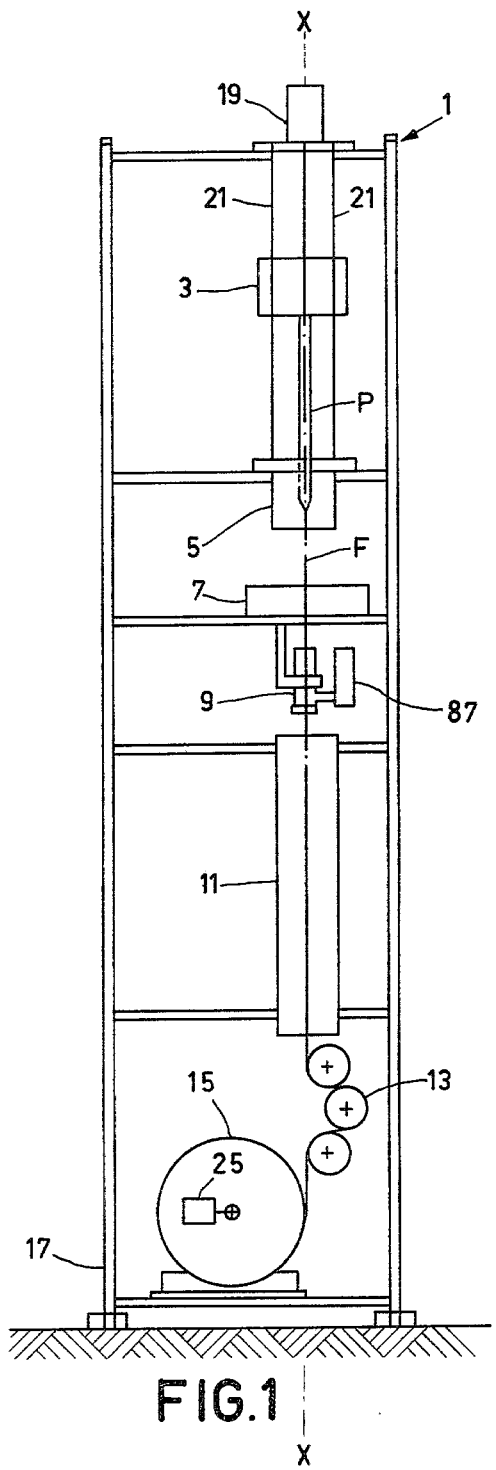
FIG. 1 schematically represents an embodiment of an apparatus according to the invention for manufacturing optical fibers.

The apparatus 1 shown in FIG. 1 for manufacturing optical fibers comprises a holder 3 for a preform P, a furnace 5 for heating the preform for drawing a fiber F, a measuring device 7, a coating device 9, a drying device 11, a drawing force measuring device 13 and a reel 15. These components and devices are mounted on a common frame 17, the center lines of the furnace 5, the measuring device 7 and the coating device 9 coinciding with a common axis X—X. The holder 3 is moved in a manner, known per se, by a drive mechanism 19 on guides 21. The reel 15 is driven by a motor 25 and also serves as drawing device. The measuring device 7 serves for measuring and checking the diameter of the fiber F.

Figure 2:
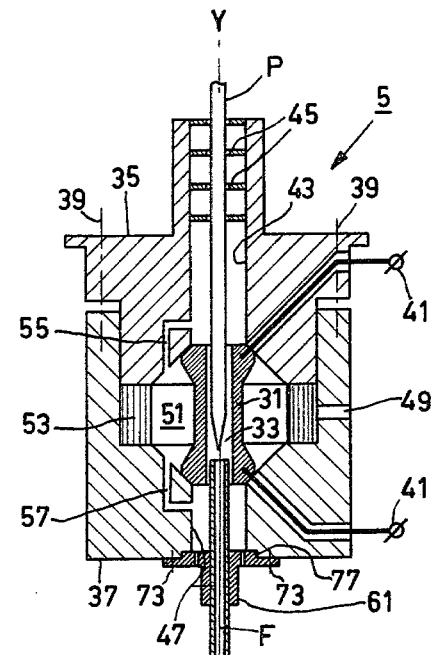
FIG. 2 schematically represents the furnace of FIG. 1 in longitudinal section.

FIG. 2, in a longitudinal section, represents the furnace 5 with a substantially tubular interchangeable graphite heating element 31, which comprises a central cylindrical heating chamber 33 and which is secured between two housing sections 35 and 37, which are interconnected by screw connections 39. The heating element 31 is heated by direct current passage and for this purpose it is connected to terminals 41 for the connection to a power supply source, not shown. The housing section 35 is formed with an entrance opening 43 for feeding a preform P into the heating chamber 33, in which entrance opening sealing partitions 45 are arranged, The housing section 37 is formed with an exit opening 47 and a supply duct 49 for the supply of an inert gas, preferably argon. The supply duct 49 opens into in an annular gas chamber 51 which surrounds the heating element 31. A filter insulation 53 of zirconium-dioxide is arranged on the circumference of the chamber 51. The gas chamber 51 communicates with the entrance opening 43 via gas ducts 55 in the housing section 35 and with the exit opening 47 via gas ducts 57 in the housing section 37. In the exit opening 47 a condensation element 61 is arranged, which is shown on an enlarged scale in FIG. 3.

The condensation element 61 comprises a tube 63 of a high-melting pure material, such as quartz glass or platinum and is adjustably secured by means of a clamping screw 65 in a bore of a substantially disc-shaped support 69. The support 69 is formed with holes 71 for the connection to the housing section 37 by means of screw connections 73. By means of a centering flange 75 on the support 69 and a centering rim 77 on the housing connection 37 the support 69 is centered in such a way that the axis Z—Z of the tube 63 coincides with the axis Y—Y of the heating chamber 33. The portion of the support 69 between the centering flange 75 and the bore 67 is formed with a plurality of outlet ducts 79 which are regularly spaced over the circumference. The tube 63 has an outer diameter smaller than the diameter of the heating chamber 33 and is positioned in such a way in the axial direction that one end extends into the heating chamber 33 near the melting zone and the other end freely projects from the furnace 5. The housing sections 35 and 37, in a manner known per se, are provided with cooling chambers and cooling ducts, not shown, and are preferably made of a material having a high coefficient of thermal conduction, such as copper or aluminium.

For manufacturing fibers a preform P, consisting of, for example, a quartz glass rod or of a composite rod comprising a core and a quartz glass cladding, is secured in the holder in such a way that the axis of the preform P coincides with the axis X—X of the apparatus. The preform is axially positioned in such a way that the lower end is disposed in the melting zone of the furnace 5. As a result of the heating in the furnace 5 the lower end of the preform P begins to melt, while simultaneously a fiber is formed. The fiber is passed through the measuring device 7, is threaded through the coating device 9, is passed through the drying device 11, is passed over the drawing force measuring device and is finally fixed to the reel 15. After this the process can proceed continuously, the preform P being fed in with constant speed by the drive mechanism 19, the fiber F being drawn with a constant drawing speed by the reel 15.

Figure 3:
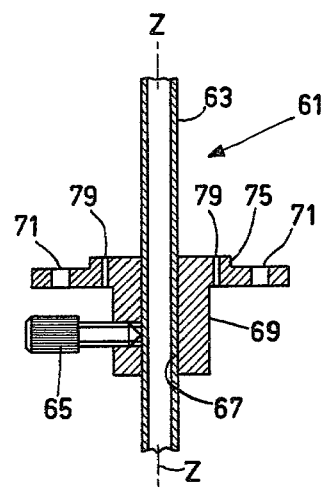
FIG. 3 shows a part of the furnace of FIG. 2 on an enlarged scale.

Contamination of the fiber F by settlement of reaction products formed in the furnace 5 is minimized according to the invention by the tubular condensation element, shown in FIGS. 2 and 3, which functions as a cold spot and as a contaminant trap, and which binds the reaction products, so as to prevent reaction products from settling on the fiber. Via the supply duct argon is supplied, which is filtered by the filter insulation 53 and which spreads in the gas chamber 51. Via the ducts 55 and 57 the gas chamber communicates with the entrance opening 43, the exit opening 47 and the heating chamber 33. Admission of air is prevented by a first gas stream which flows to the exterior through the entrance opening 43, along the preform P and between the sealing partitions 45 and the preform. Another part of the gas flows through the exit opening 47 and through the outlet openings 79 to the exterior. A further part of the gas flows through the tubular condensation body, reaction products entrained by the gas stream settling on the inner circumference of the condensation element. In the interior of the furnace a substantially uniform slight overpressure is sustained.

What is claimed is:

1. A method of manufacturing fibers comprising the steps of:

heating an end of a preform in a furnace until the end of the preform becomes melted;

drawing a fiber from the melted end of the preform;

flushing the melted end of the preform and the fiber with an inert gas; and withdrawing the fiber from the furnace;

CHARACTERIZED IN THAT there is also performed the step of condensing contaminants and gaseous reaction products from the inert gas along a condensation element which surrounds the fiber, substantially all condensed contaminants and gaseous reaction products condensing and settling on the condensation element.

2. An apparatus for manufacturing fibers comprising:

means for holding and feeding a preform;

means for heating the preform received from the holding and feeding means, said heating means having an exit opening surrounding the fiber; and means for drawing a fiber from the heated preform;

CHARACTERIZED IN THAT the apparatus further comprises means for condensing contaminants and gaseous reaction products, said means being arranged in the exit opening of the heating means, substantially all condensed contaminants and gaseous reaction products condensing and settling on said means.

3. An apparatus as claimed in claim 2, wherein the heating means comprises a furnace having a heating chamber communicating with the exit opening, and wherein the condensation means comprises a tubular condensation element which surrounds the fiber, said condensation element extending from within the heating chamber to the outside of the furnace.

4. An apparatus as claimed in claim 3, wherein the heating chamber and the condensation element are arranged on a single axis.

5. An apparatus as claimed in claim 4, wherein the condensation element is secured in a central bore of a disc-shaped support which is formed with a plurality of outlet ducts and which is arranged in the exit opening of the furnace.

6. An apparatus as claimed in claim 5, wherein the condensation element is made of quartz glass.

7. An apparatus as claimed in claim 5, wherein the condensation element is made of platinum.

* * * * *